(No Model.) 8 Sheets—Sheet 1.

N. S. CLEMENT.
DOVETAILING MACHINE.

No. 388,760. Patented Aug. 28, 1888.

Witnesses,
F. H. Schott
W. V. Burris

Inventor,
Nathan S. Clement
By his Attorney, N. Cranford (No Model.) 8 Sheets—Sheet 2.
N. S. CLEMENT.
DOVETAILING MACHINE.

No. 388,760. Patented Aug. 28, 1888.

Witnesses,
F. H. Schott.
W. V. Burris.

Inventor.
Nathan S. Clement.
By his Attorney N. Cranford.

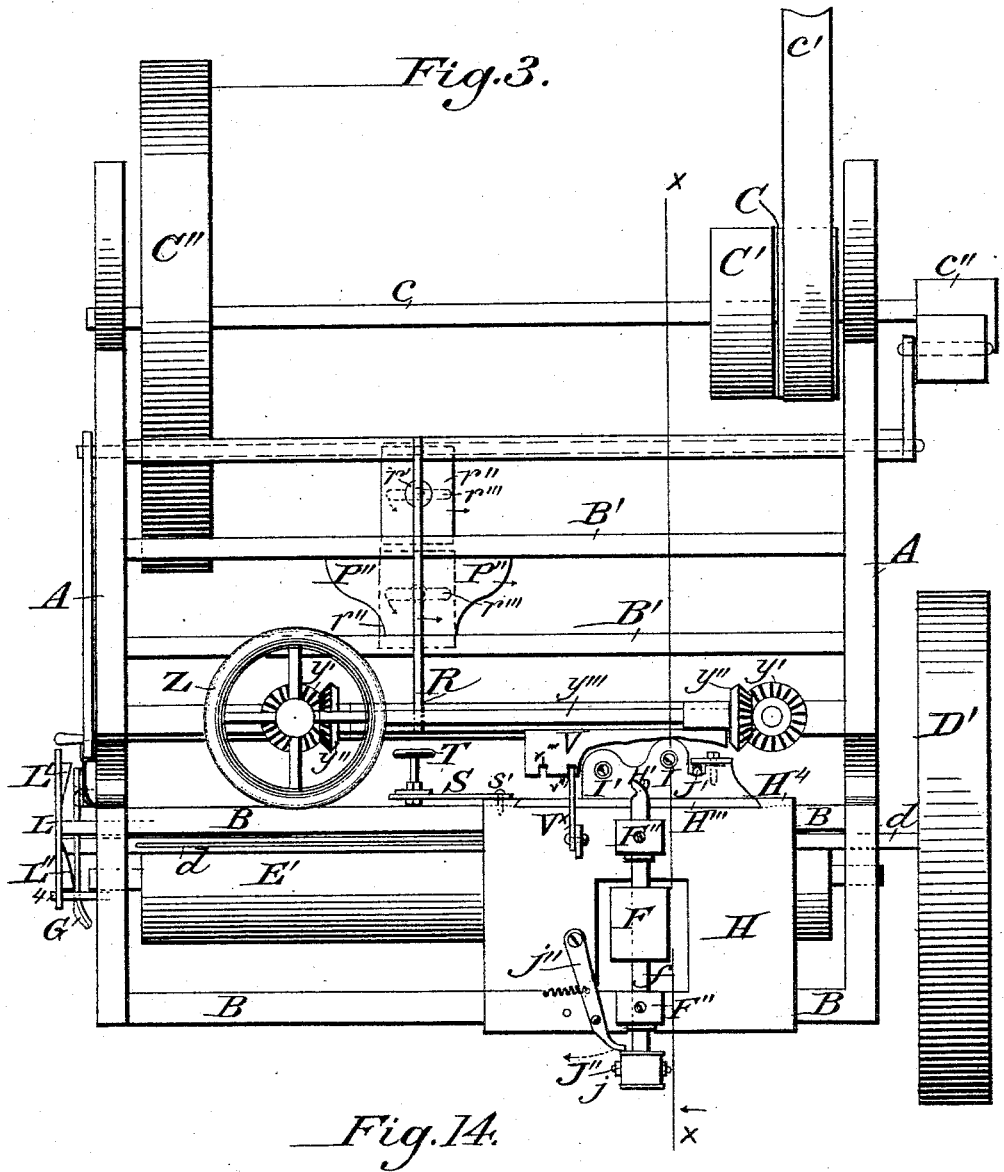

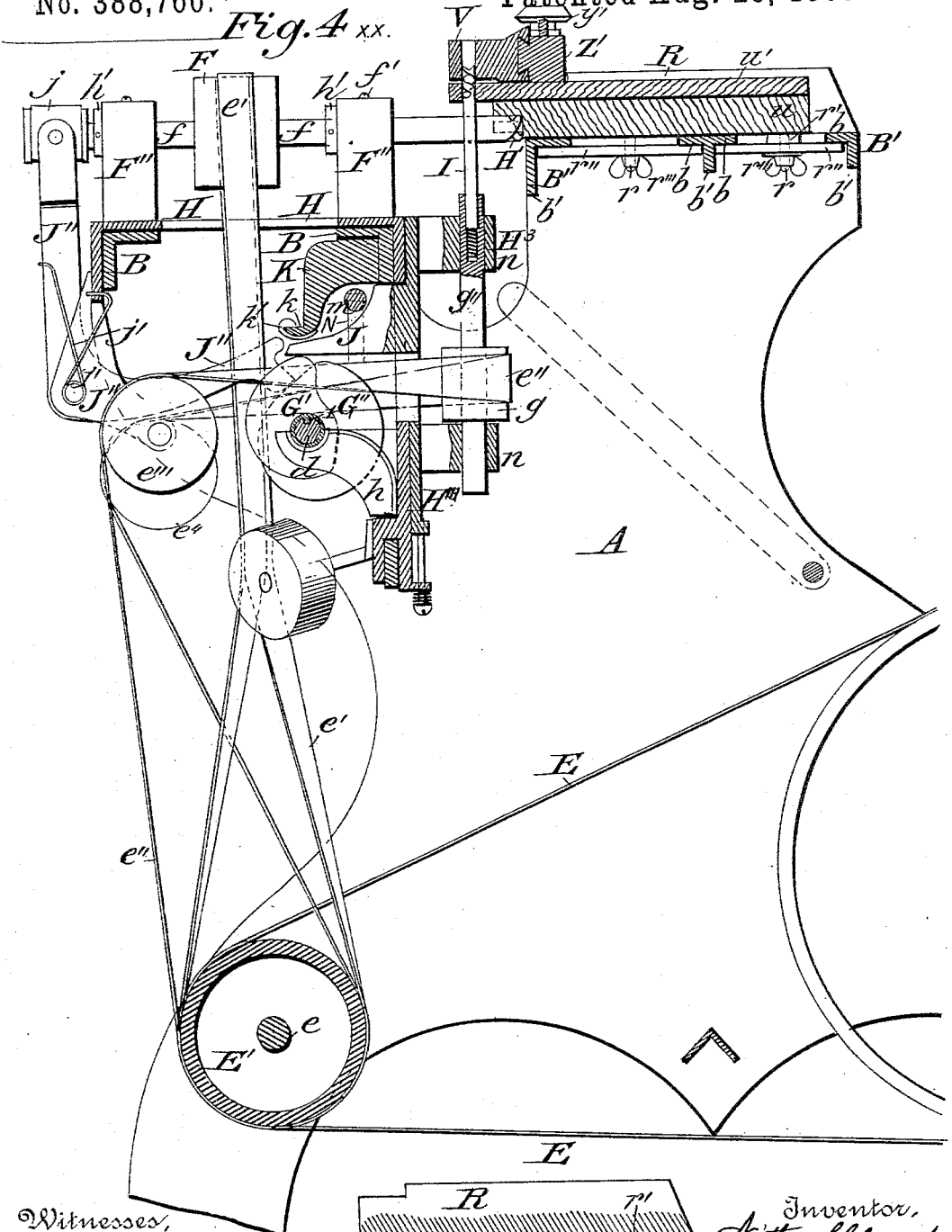

(No Model.) 8 Sheets—Sheet 5.
N. S. CLEMENT.
DOVETAILING MACHINE.
No. 388,760. Patented Aug. 28, 1888.
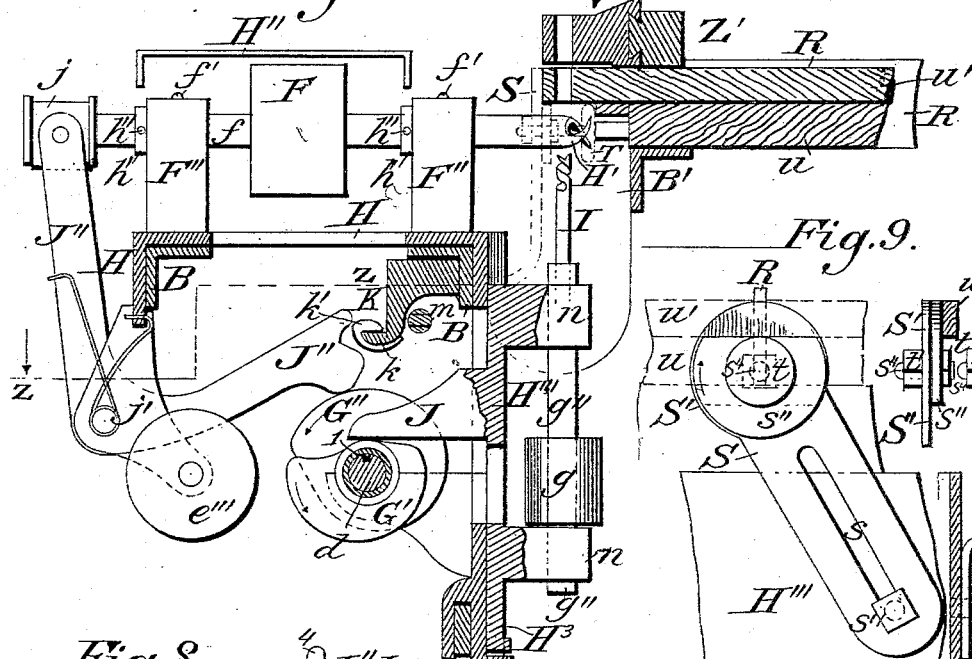
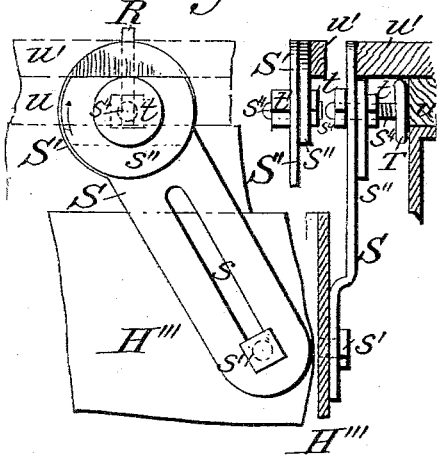
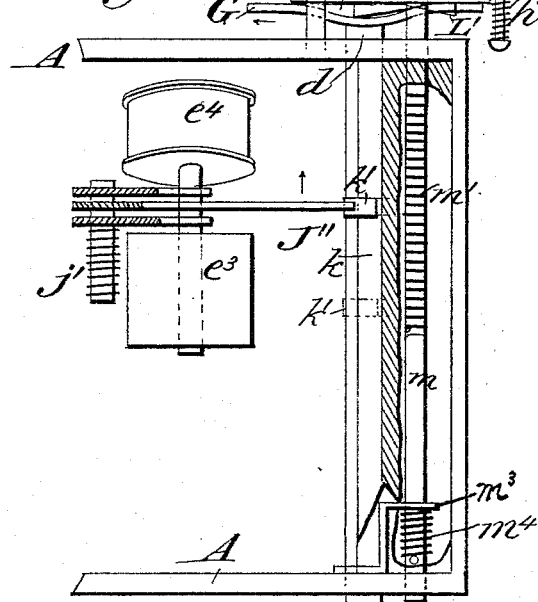
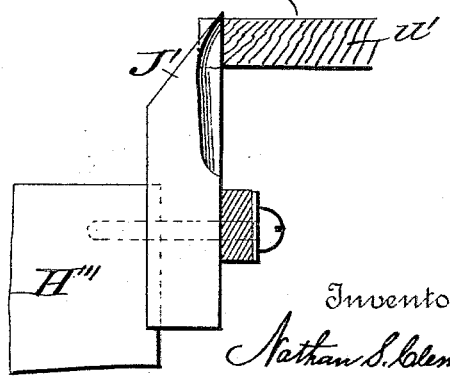
Witnesses.
F. H. Schott.
Alx. Scott.
Inventor,
Nathan S. Clement.
By his Attorney, A. Crawford.

(No Model.) 8 Sheets—Sheet 6.
N. S. CLEMENT.
DOVETAILING MACHINE.
No. 388,760. Patented Aug. 28, 1888.
Fig. 6.
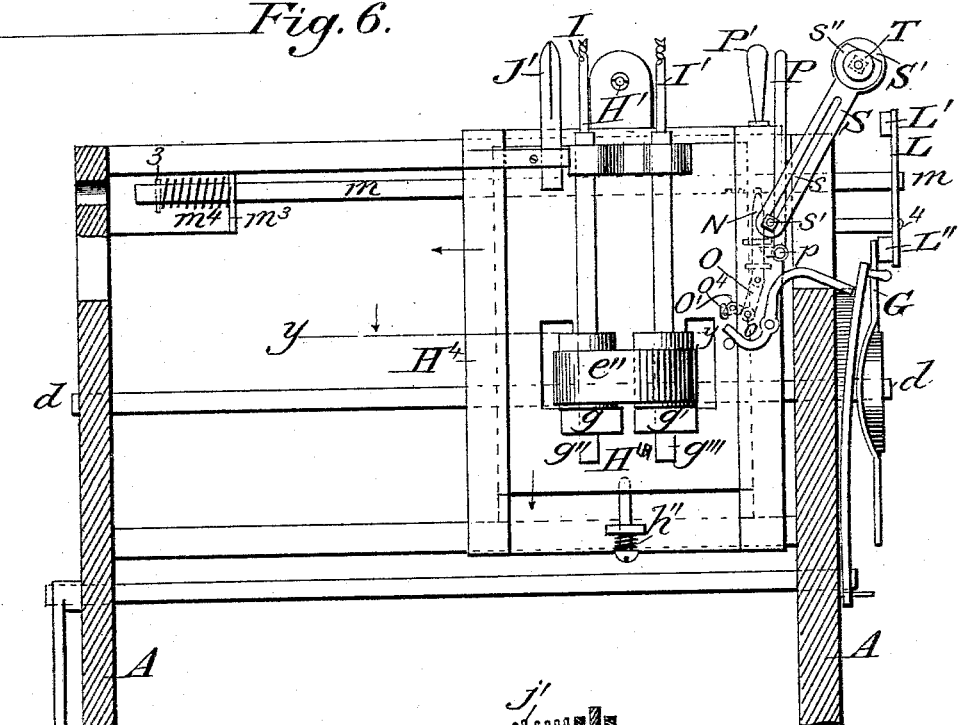
Fig. 7. y.y.
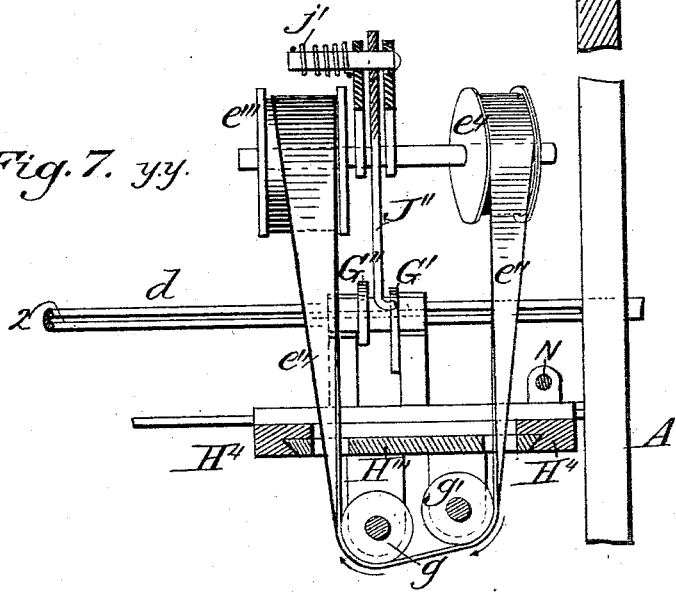
Witnesses,
F. H. Schott.
W. V. Burris.
Inventor,
Nathan S. Clement.
By his Attorney A. Cranford.

(No Model.) 8 Sheets—Sheet 7.
N. S. CLEMENT.
DOVETAILING MACHINE.
No. 388,760. Patented Aug. 28, 1888.
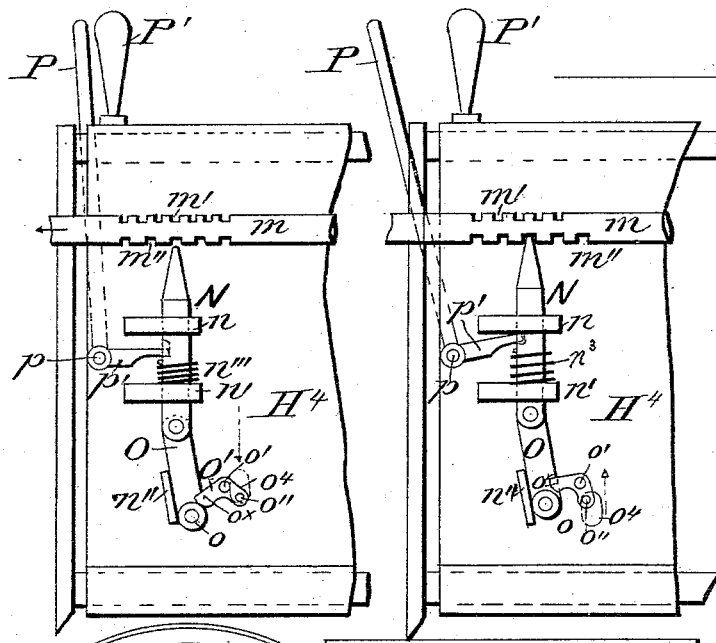
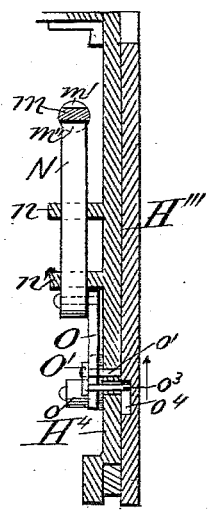
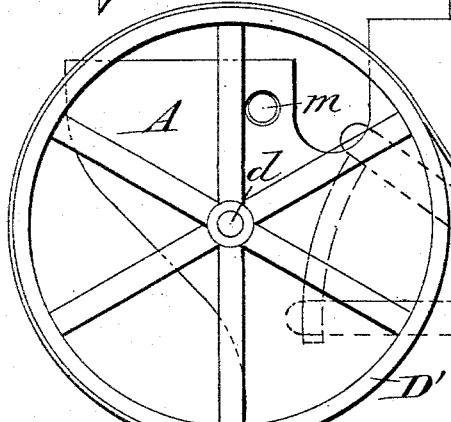
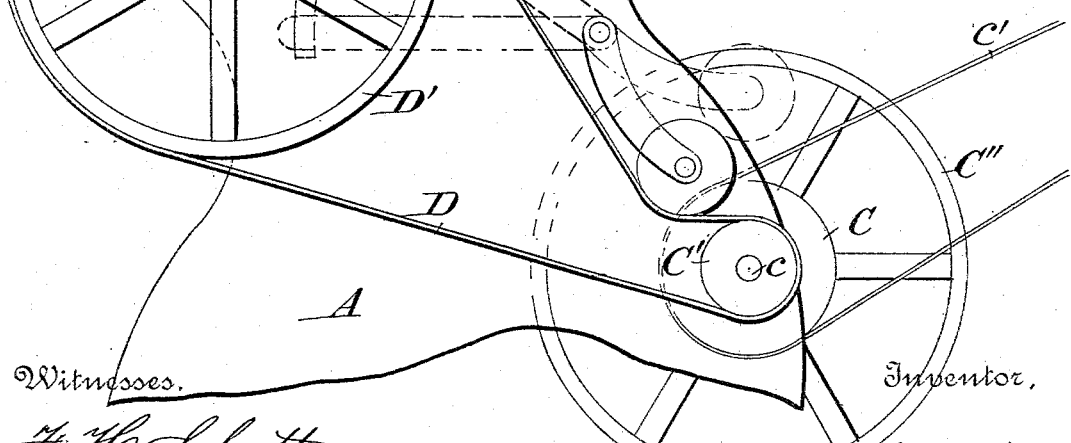
Witnesses.
H. H. Schott,
W. V. Purris.
Inventor,
Nathan S. Clement,
By his Attorney.
N. Crawford.

(No Model.) 8 Sheets—Sheet 8.
N. S. CLEMENT.
DOVETAILING MACHINE.
No. 388,760. Patented Aug. 28, 1888.
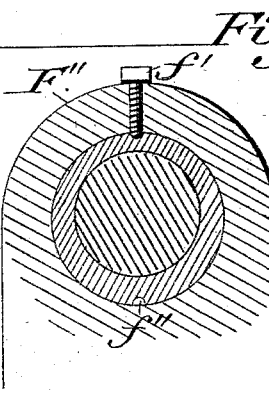
Fig. 15.
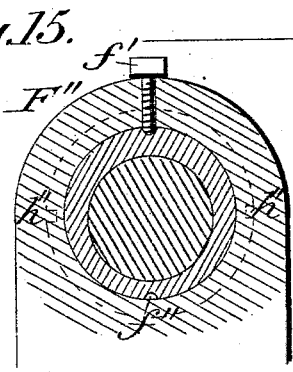
Fig. 16.
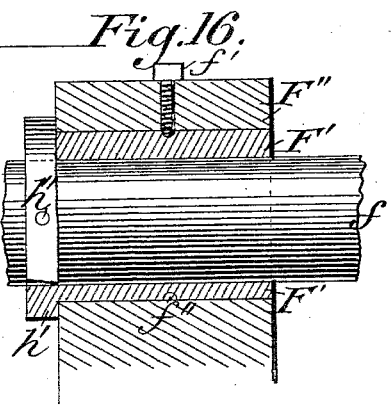
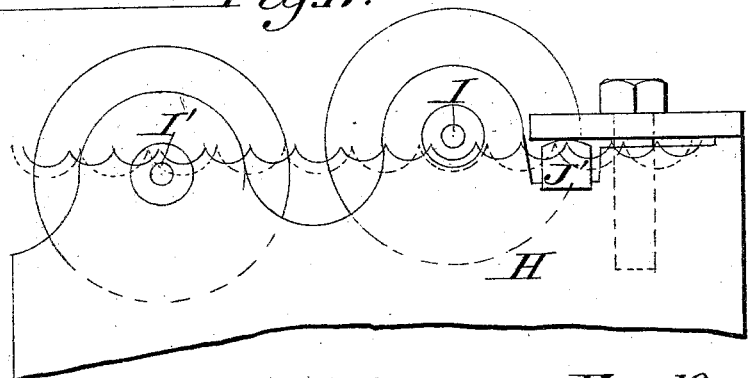
Fig. 17.
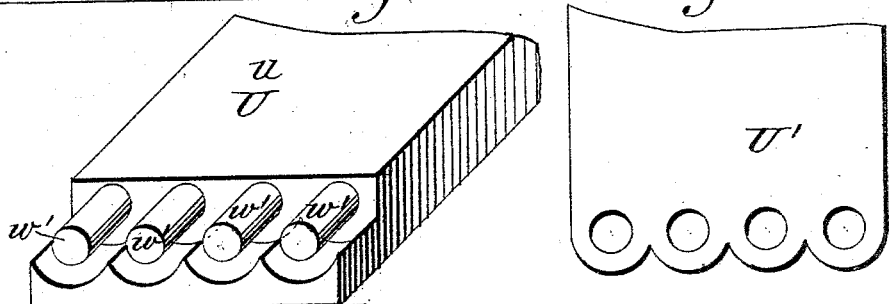
Fig. 18. Fig. 19.
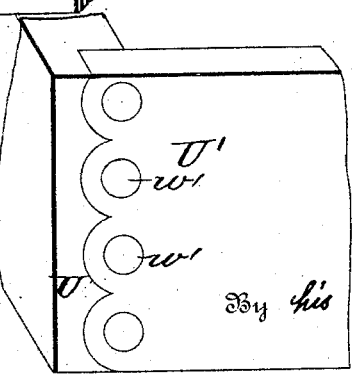
Fig. 20.
Witnesses,
F. H. Schott,
W. V. Burris.
Inventor,
Nathan S. Clement.
By his Attorney N. Crawford.

UNITED STATES PATENT OFFICE.

NATHAN S. CLEMENT, OF NORTHAMPTON, MASSACHUSETTS, ASSIGNOR TO WILLIAM B. HALE, TRUSTEE.

DOVETAILING-MACHINE.

SPECIFICATION forming part of Letters Patent No. 388,760, dated August 28, 1888.

Application filed November 21, 1887. Serial No. 255,813. (No model.)

*To all whom it may concern:*

Be it known that I, NATHAN S. CLEMENT, a citizen of the United States, residing at Northampton, (Florence P. O.,) in the county of Hampshire and State of Massachusetts, have invented certain new and useful Improvements in Dovetailing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to improve the dovetailing-machine for making joints where two pieces of stock are joined together, one piece at right angles with the other, such as seen in the drawers for desks, tables, bureaus, or wherever a drawer is used, as patented January 2, 1872, No. 122,390, whereby the machine is simplified in its operation and the work done by my improvement is more perfect; and the invention consists in the construction of certain parts of the machine and their combination with other parts to perfect the work of the machine, as will be fully hereinafter described.

Figure 1:
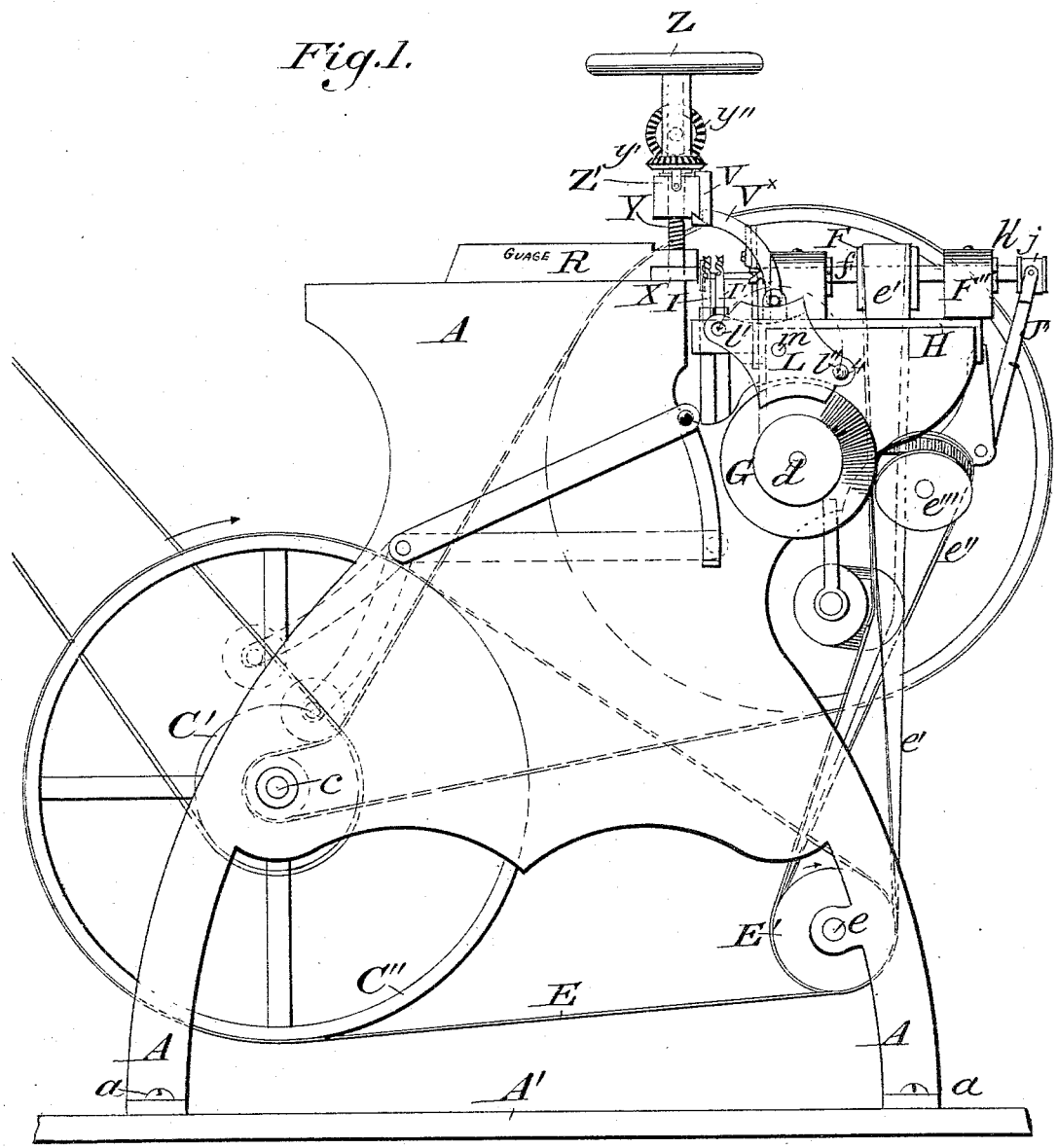
Figure 2:
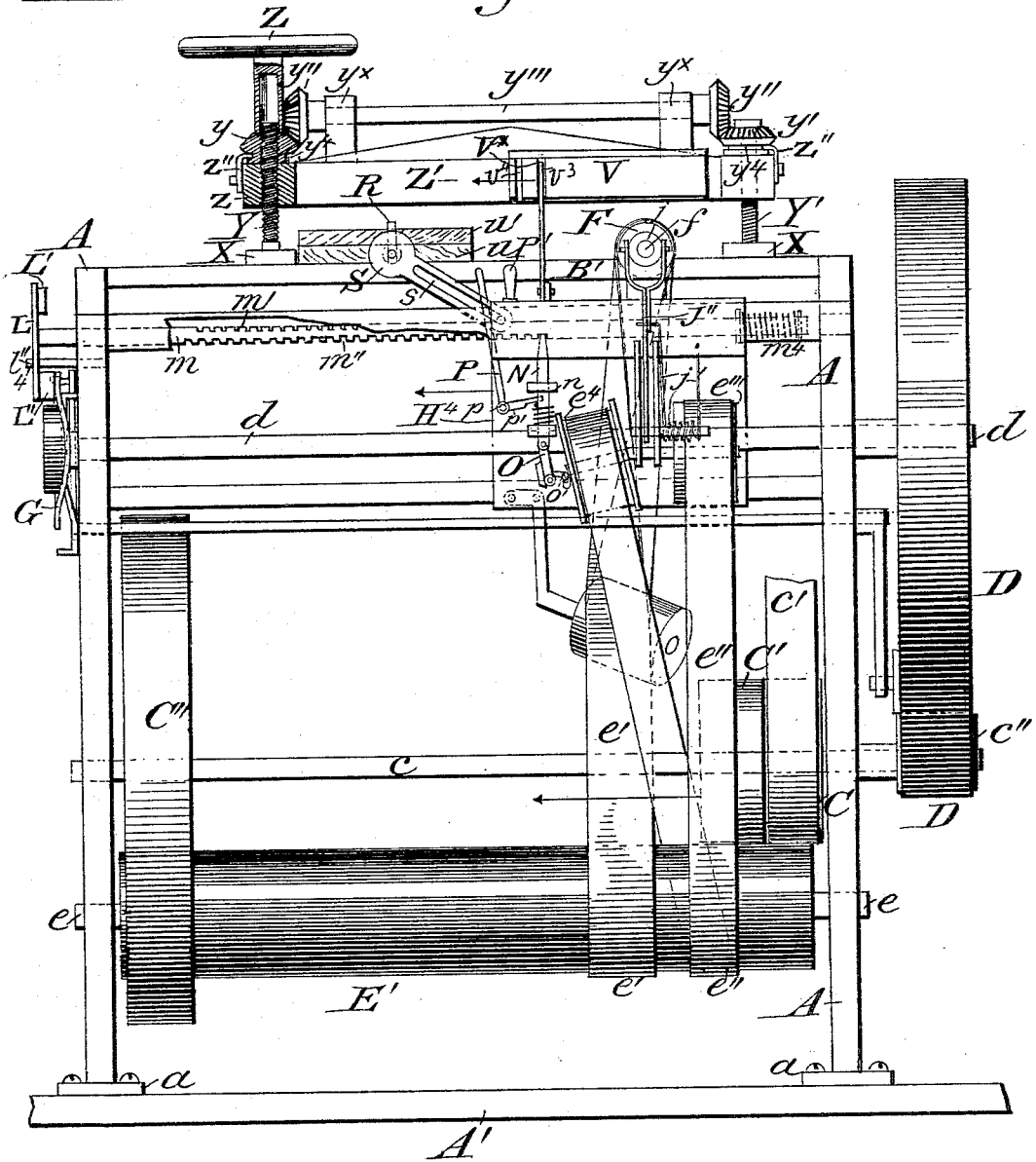

In the drawings, Figure 1 represents a vertical side view of the machine. Fig. 2 represents an end view of Fig. 1. Fig. 3 represents a top view of the machine. Fig. 4 represents an upright view, partly in section, on line X X of Fig. 3. Fig. 5 represents a side view of a hollow auger-bit shaft and means for reciprocating the bit horizontally out of contact with the stock after the action of the bit upon the stock; also a sectional view of the horizontal carriage and the vertical reciprocating carriage with an upright augur-bit shaft and augur-bit attached, as seen also in Fig. 4. Fig. 6 represents a transverse view of the feed-rod, a side view of the upright carriage having two auger-bits, and the scallop-cutter thereon and a side transverse view of the revolving cam that actuates the feed of the carriage. Fig. 7 represents a plan view, in part, of Fig. 6, giving direction to the belt that gives revolution to the upright augers, and a view in section of how the upright carriage is attached to the transverse carriage. Fig. 8 represents a top view of feed-rod, cam, and plate by which a change in the feed to transverse carriage is made. Fig. 9 represents an enlarged side view of the end gage for the stock to abut against and its means of adjustment to fit stock of different thicknesses. Fig. 10 represents a side and top view of the scallop-cutter as attached to its carriage. Fig. 11 represents an enlarged side view of the holding-dog with the feed rod, its attachment to its carriage, means for operating it, and means for holding it out of contact with the feed-rod automatically or by hand. Fig. 12 represents a transverse sectional view of the carriage to which the holding-dog is attached and its actuating devices. Fig. 13 represents a side view of a part of the machine, its belts and pulleys by which the machine is put in motion. Fig. 14 represents a side of the cutting-block, showing different sizes of holes through it and different-sized scallops and the holding-notches on its edge. Fig. 15 represents end views in section of the eccentric-bushings in which the horizontal hollow auger-shaft is adjusted to different-sized auger-bits when necessary. Fig. 16 represents a side view of same, partly in section. Fig. 17 represents a top view of the relative position of the upright auger-bits and the scallop-cutter with each other. Figs. 18 and 19 represent the parts of a joint, and Fig. 20 represents the joint complete.

A represents the supporting-frame of the machine; A', the floor upon which the machine stands; a, the bolts that secure the machine to the floor.

B B represent the bed for the carriage, and upon which the stock-carriage reciprocates transversely, the bed being secured upon the top of a part of the frame A.

B' B' is the bed upon which the stock is secured to be operated upon by the actuating parts of the machine.

C is a pulley upon counter-shaft c, getting motion from or through belt c' from any convenient power and passing around pulley C.

C' is a loose pulley on shaft c, upon which the belt c' can be shifted to stop the motion of the machine.

$c''$ is a pulley on the outer end of shaft $c$, that through belt D motion is given to pulley D' on transverse shaft $d$.

E is a belt around pulley $c''$, and thence goes around drum E' on transverse shaft $e$, and gives motion to drum E', which extends across or nearly across frame A.

$e'$ is a belt around drum E', extending upward and is deflected to go around and give motion to pulley F on shaft $f$. $e''$ is another belt around drum E', extending upward and deflected by guide-pulley $e'''$ to a horizontal direction to go around pulleys $g$ $g'$ fast on upright shafts or spindles $g''$ and $g'''$, respectively.

G is a cam fixed upon end of shaft $d$ opposite to pulley D'.

G' and G'' are two cams placed upon shaft $d$ and revolve therewith, and are held in position on the shaft by a feather, 1, in groove 2 in shaft $d$.

$h$ represents a support to shaft $d$, at or near to where the greatest strain comes upon the shaft by the lifting of the weight that comes upon cams G' and G'' in operation.

H is a carriage that slides transversely across the machine on bed B B, and carries pulley F, reciprocating horizontal shaft $f$, and the hollow auger H'. Shaft $f$, which carries the hollow auger H', revolves in external eccentric-bushings F', in bearings F''. The eccentric-bushings can be revolved in the bearings F'', and when in position are held so by the holding-screws $f'$ in indent $f''$. The hollow auger H' is raised or lowered by turning the eccentric-bushings a half-turn in bearings F'', which permits a larger or smaller auger to be used, as desired, when such change is necessary by a change in stock. The bushing in a bearing is changed in its position by having collars $h'$ and $h''$ integral with the bushings and outside of the bearings with holes $h'''$ therein, so that a spanner-wrench, H'', with bent ends to enter the holes $h'''$, will turn the bushing a half-revolution.

Attached to and dropping down from the forward side of the carriage H are guideways H⁴—one at each side of the carriage—and the ways are constructed to allow the upright or vertical reciprocating carriage H''' to freely slide in and be guided thereby.

I and I' are upright auger-bits fixed in shafts $g''$ and $g'''$, which are attached to the vertical reciprocating carriage H''', and are revolved by belt $e''$ around pulleys $g$ $g'$, and reciprocating with carriage H'''.

To vertically reciprocate the auger-bits I and I', the cam G', in its revolution with shaft $d$, engages a lifter, J, that is attached to carriage H''', which causes the carriage with the auger-bits to be raised by the cam by its increasing diameter, and when its greatest projection is reached and the augers have performed their work the cam, being reduced in diameter, allows the lifter and the carriage to quickly fall by their own weight.

Attached to carriage H''' is a scallop-knife, J', to cut and finish the rounded or scallop part of the joint of a side or runner of a drawer upon its ends.

The upright auger-bits do not operate on the same line with the reciprocations of carriage H, as auger-bit I' bores its holes between the scallops or rounded part of the joint in order to relieve the knife J' of a part of its work, while auger-bit I bores its holes in the side or runner of a drawer to go over the pins made by the horizontal hollow auger in the end of a front of a drawer.

The horizontal hollow auger H' in shaft $f$ is reciprocated out of contact with the stock after it has made its circular cut and center-pin by the construction of cam G'' in its revolution with shaft $d$, through a pivoted bell-crank lever, J'', attached by sleeve $j$ on shaft $f$, simultaneously with the withdrawal of auger-bits I and I', and it is forced forward to cut its circle and pin for a joint by a spring, $j'$, forcing the lever J'' upon cam G''. At any time the hollow auger H' is not wanted to bore a circle and pin, a bracket, K, is attached at a proper point to frame A, having hook $k$ on its lower projecting end—that is, just out of the oscillation of lever J''—by cam G''. A removable spring-stop, $k'$, is forced upon the hook $k$ when lever J'' is above it, causing a projection beyond the fixed hook $k$ and within the line of the oscillation of lever J'', and thus holds the lever from falling, and the forward reciprocation of the auger toward the stock is arrested until the stop $k'$ is removed. The pivoted spring-lever $j''$, Fig. 3, may be used to hold the auger back.

The carriage H is reciprocated upon the bed B transversely by means of the revolving cam G on shaft $d$, having a portion of its face bent to one side, and in its revolution it comes in contact with and acts upon a cam-plate, L, having holes $l$ and $l'$ in its extreme opposite projecting points, and opposite inwardly-projecting inclines L' and L'' on its inner face, one incline, L', being less in projection than incline L''. Cam-plate L is fixed upon the outer end of a rotative transverse feed-rod, $m$, having notches $m'$ on one side and notches $m''$, having a longer space between them than between notches $m'$, on the opposite side. Feed-rod $m$ is journaled at its outer end in bearings in frame A, and at its inner end in the vertical part of a bracket, $m^3$, beyond which its extension has a coiled spring, $m^4$, secured thereon and held by pin 3, its inner end bearing against the side of bracket $m^3$, which spring causes the cam-plate incline to always bear against the irregular face of cam G in its revolutions.

When different thicknesses of stock are used for making a joint, different sizes of boring and scalloping tools are used; hence a difference in the feed to the stock-carriage must be had to correspond with the size of the auger-bits and scallop-cutter. To do this and change the lesser feed to a greater to agree with the increased size of tools, the cam-plate L, having the greater projecting incline L'' thereon, is brought to bear upon cam G. The feed-rod $m$, and its side having the longest spaces between notches, is used to reciprocate the carriage in contradistinction to the lesser projecting incline L' on the cam-plate L, and smaller tools for making a joint. The feed-rod $m$ is connected to carriage H by the depending guides H⁴ of carriage H''' by the projecting guides $n$ and $n'$, fast to back side of guides H⁴, each of which has a guide-hole through it, and one hole is vertical over the other, and through the holes is placed a detent or dog, N, its upper end formed to enter into the notches $m'$ or $m''$ in feed-rod $m$.

The dog N, above the lower guide, $n'$, has a coiled spring, $n'''$, around it to act upon and hold the point of the dog in the notches of the feed-rod, and at its lower end is pivoted a link, O, having a friction-roller, $o$, at its extreme lower end. One edge of link O bears against the side of an inclined projecting guide, $n''$, fast on upright guides H⁴.

O' is a bell-crank cam pivoted at its angle $o'$ to H⁴. Its limb $o''$ has a pin, $o'''$, passing through it at its end, thence through H⁴, projecting into a slot, $o^4$, in carriage H''', while the limb $o^\times$, being overbalanced or heavier than its opposite limb and pin, consequently it bears all the time upon friction-roller $o$, and by the reciprocations of the carriage H''' the slot $o^4$ acts upon the pin $o'''$, in its downward movement, to raise the limb $o^\times$ up, which allows the detent or dog to enter the notches in the feed-rod, as seen in Fig. 11; but when the upright carriage reciprocates upward the slot $o^4$ acts to force the dog out of the notches in feed-rod $m$, and the limb $o^\times$ is then in position to hold the dog against the spring out of contact with the feed-rod, where it remains until the carriage reverses its reciprocation and raises the cam O', which construction acts to reciprocate the carriages H and H''' transversely from one side of the machine to the other.

To change the feed of the carriages H and H''', the cam-plate L, when the dog N is out of contact with the feed-rod $m$, is rotated a half-revolution, when a hole in the cam-plate slides onto pin 4, that is fast to frame A, which will bring the opposite side of the feed-rod into action, and the construction of the parts as described will change the feed of the carriage to be more or less. It is necessary after the carriage has been fed across the machine to return it to its first position quickly, which is done by a pivoted hand-lever, P, at $p$ to H⁴, and extending upward above the machine, and be vibrated in and out, while a right-angled lifter, $p'$, extends to and its pointed end enters a slot in the dog N.

P' is a hand-hold fast to carriage H, and by seizing the lever P and the hand-hold P' and bringing the lever to the hand-hold the dog is out of contact with the feed-rod, and the carriage can then be reversed or moved to its first position, and the carriage is ready to be again acted upon automatically.

R is a longitudinal adjustable gage secured upon the stock-bed B', is made of metal, has depending pins $r$, screw-cut on their lower ends, ribs $r'$, integral with the body of the gage, of the same thickness as the horizontal faces of the ribs $b$ of bed B', and between which the ribs $r'$ slide with the gage as it is adjusted, and when adjusted is held in place by the screw-pins $r$, which pass down through plates $r''$, that just fit between the depending webs $b'$ of ribs $b$, and underneath the projecting horizontal faces of ribs $b$, and by turning the thumb-nuts $r'''$ on screw-pins $r$ hard against the plates $r''$ the gage R will be fast upon bed B'. Gage R has another means by which its right position is maintained on the bed in reciprocating it by a guide-head, P'', Fig. 3, integral with R, and sliding between the ribs $b$ of the bed B'. The gage is adjustable for the purpose of giving the right position to the stock to be acted upon as it is presented to the boring and scallop tools, and is adjusted on the bed to accommodate the working of different widths of stock, wide stock on but one side, or narrow stock placed upon opposite sides of the gage.

V is a movable cutting-block having two holes, V' and V'', through its thickness. A hole receives the bit I after it has bored through the side or runner U of a drawer to receive pin $w'$, made by hollow auger H' in the ends of a front, U', of a drawer, Figs. 18 and 19. This cutting-block has holes V' and V'' through it and the two sizes of scallops $v'$ and $v''$ on its edge, showing the two sizes of boring-bits for the pins in the sides or runners and scallops on the ends of the sides or runners to fit the pins and circle portion in the ends of a front of a drawer cut by two sizes of hollow augers. This cutting-block is held in place on the carriage H, and to prevent longitudinal displacement notches $v'''$ and $v^4$ are cut in its edge, Fig. 4, and a holding-dog, V$^\times$, Fig. 3, is pivoted to carriage H, to turn into the notch $v'''$ for a large hole and scallop, or into notch $v^4$ for a smaller hole and scallop. The edge opposite the holes and scallops in this block has a dovetail groove in it to give it freedom to reciprocate upon any fixed convenient transverse guide having a dovetail tenon on its side to receive the dovetail mortise in the cutting-block, and it is shown to slide upon a clamp-bar that holds the stock on the bed, Figs. 2 and 5.

To gage the ends of the fronts and sides or runners of drawers to have the hollow auger H' bore the pin $w'$, and the upright bits I and I' and scallop-tool J' to bore and cut the end of runner U in shape, Fig. 19, an adjustable metal gage, S, is provided with a longitudinal slot, $s$, which is screw-bolted through the slot to the guides H⁴ of carriage H''' by the screw $s'$, having a circular head, S', and a bolt-hole centrally through the head to receive the bolt $s^4$.

$s''$ represents a disk, two-third parts (more or less) of a full circle, having a center hole to receive the screw bolt $s^4$.

T is a milled head to the screw-bolt $s^4$, and is the adjustable gage for the end of a front of a drawer to abut against when in position to be acted upon by the hollow auger H' to form pin $w'$, and adjusts the front to be bored exactly to the depth of the thickness of the runner or side piece to a drawer into the end of a front of a drawer by the position of the screw-bolt $s^4$ and its nut $t'$ on the forward side of gage S.

When a large joint is to be made, the side or runner piece of a drawer abuts against the head S'; but when a small pin and scallop are made the runner or side piece of a drawer abuts against the circle on disk $s''$, which are turned up to stop the end of the side or runner of a drawer against. The disk $s''$ is adjusted and secured in position for different thicknesses of drawer sides or runners by the check-nut $t$ on screw-bolt $s^4$.

U' represents the front of a drawer placed upon bed B' with its face side up and bottom edge against the gage R. The side or runner of a drawer, U', is placed on the top of the front, its bottom edge against gage R, its outside face uppermost and extending as far over the end of the front piece toward the auger-bit H' as the sides or runners of a drawer are in thickness, and abutting against the gage S' or disk $s''$, as the case may be, while the end of the front of a drawer abuts against the gage T. The stock being so placed and secured and operated upon, a joint for one end of a front piece and the end of a side or runner of a drawer to fit the front piece is complete. Then the same front piece, with its ends reversed, is placed upon the opposite side of gage R, its face side up and its bottom edge against gage R. Another side or runner of a drawer is placed on the top of the front, its inside uppermost, when the operation as first described is repeated, and the joints are complete for the front and sides or runners of a shallow drawer; but when the stock for deep drawers is to be operated upon only one side of gage R is used to hold the stock against. The stock being placed upon bed B' and adjusted with relation to the operating tools and gages, as above described, is firmly held in such position by a proper clamping device, consisting of two metal bases, X X', secured to bed B' and on opposite sides thereof.

Y is an upright screw-cut shaft, its bottom end secured in base X', so as to prevent its rising, but free to revolve in said base, extending up through a bevel gear-wheel, $y$, having its eye screw-cut, and a circumferential groove, $y^4$, near its lower side; thence up to receive a hand wheel or winch, Z, at its upper end, and by which the screw-shaft is revolved. Y' is an opposite upright screw-shaft with bevel-gear $y'$, with nut and other constructions, the same as shaft Y. The gear-wheels $y$ and $y'$ gear into gear-wheels $y''$ and $y''$ on transverse rotative shaft $y'''$, in bearings supported on the transverse clamping-bar Z', having a screw-nut, $z$, in each of its ends. By revolving the hand-wheel Z in one direction the clamping-bar is forced down upon the stock on the bed, and by reversing its revolution the clamping-bar is raised up and the stock is free. Instead of the screw-nuts $z$ being in each end of the clamping-bar, a hole in each end of bar Z', for the upright shafts to pass through, is made, and bent coupling-bars $z''$ are secured to each end of bar Z' to project into the circumferential grooves $y^4$, which will hold the clamping-bar in contact with the gear-wheels and raise or lower the clamping bar as the hand-wheel is turned.

Fig. 17 shows how the hollow auger shaft $f$ is changed to accommodate hollow auger H', to be of larger or a smaller diameter, by which the size of the circle and pins it makes may be small or large, to better agree with the width and differing thickness of stock.

All parts of the machine being constructed as described, the stock for drawers placed and secured thereon, motion is given to the actuating parts from pulley C through the several described belts and pulleys to give motion to cam G, from which, through it and its connected devices, the carriage having thereon the two boring auger-bits and scallop-cutting tool is fed transversely and intermittingly from right to left to the stock to be acted upon, and by the revolution of cam G' and acting upon lifter J the augers I and I' and scallop-cutter J' on the vertical reciprocating carriage H''' are carried up to their work, while the horizontal reciprocating auger H' is in its revolution forced to its work in the end of a front of a drawer by a spring-power, and simultaneously with the withdrawal of auger-bits I and I' and scallop-tool J' the auger H' is forced out of action by the revolution of cam G'', acting upon a bell-crank lever and a sleeve on spindle $f$ that carries the hollow auger. When the carriage H has reciprocated or fed to the left the full distance to have the action of all the tools upon the stock to bore the holes and cut the scallops for a joint, the motion of the machine is arrested, the carriage, with its augers and scallop-tool, is reciprocated back to the right, and new stock replaced for another joint, when motion is again communicated to the machine, to go through another and same operation for a second joint.

Having thus described my invention, what I claim, and desire to secure by Letters Patent, is—

1. The combination of the horizontal reciprocating hollow auger-bits H' on carriage H, the upright auger-bits I and I', and scallop-cutter J' on vertical reciprocating carriage H''', with the adjustable gage R and end gages, S and T, constructed and operating substantially as and for the purpose described.

2. The adjustable gage R, against which one edge of the stock rests, having screw-bolts $r$, depending from its lower edge, plates $r''$ on the under side of the ribs $b$ of the bed B' and through which the bolts $r$ go, thumb-nuts $r'''$, guide-head P'', integral with the gage, in combination with the ribs $b$ and webs $b'$ of the bed, substantially as and for the purpose described.

3. The combination of the revolving cam G, cam-plate L, having the incline L' thereon, and fixed to rotative feed-rod $m$, having feed-notches, with a spring-holding dog, N, attached to part $H^4$ of carriage H, as and for the purpose described.

4. The combination of the cam-shaft $d$, cam G, reversible cam-plate L, having the inclines L' and L'' on its inside face and fixed to the rotative feed-rod $m$, having opposite notches, $m'$ and $m''$, differing in their distance apart, spring-holding dog N, secured to the part $H^4$ of carriage H, with the upright reciprocating carriage H''', carrying the auger-bits I I' and scallop-cutter J', substantially as described.

5. The combination of the hand-lever P, pivoted to $H^4$ at $p$, and having a right-angled lifter, $p'$, and dog N, with the carriage H, having hand-hold P' thereon, whereby the carriage is free to be reciprocated back to its first position, substantially as described.

6. The external eccentric-bushings F', having notches $h'$ therein, bearings F'', having holding-screws $f''$, in combination with the hollow auger-shaft $f$, substantially as and for the purpose described.

7. The combination of the revolving cam G'', pivoted and bent lever J'', bracket K, having removable spring-stop $k'$, lever J''', and sleeve $j$, with the shaft $f$ and auger H', substantially as and for the purpose described.

8. The cutting-block V, having holes V' and V'' and the circular scallops $v' v''$, and notches $v'''$ and $v^4$, arranged to slide on the clamping-bar Z', in combination with the reciprocating carriage H, having holding-dog $v^x$, pivoted thereto, substantially as and for the purpose described.

9. The revolving cam-shaft $d$, having longitudinal groove 2, cam G', key 1, and lifter J, in combination with carriage H''', carrying auger-bits I and I' and scallop-cutter J', substantially as described.

10. The adjustable gage S, having screw-bolts $s^4$, with the head T, part circle disk $s''$, rotatable and adjustable on bolt $s^4$ and held fast to gage S by nut $t$, as described.

11. The transverse reciprocating carriage H, in combination with the vertical reciprocating carriage H''', which is attached to, reciprocates in, and carried by the carriage H, substantially as described.

In testimony whereof I affix my signature in presence of two witnesses.

NATHAN S. CLEMENT.

Witnesses:
W. H. RUFF,
M. P. CALLAN.